United States Patent
Kim et al.

(10) Patent No.: US 10,397,986 B2
(45) Date of Patent: Aug. 27, 2019

(54) HEAT GENERATION APPARATUS USING PERMANENT MAGNETS

(71) Applicants: Tae Jin Kim, Seoul (KR); Byung Duk Lee, Seoul (KR)

(72) Inventors: Tae Jin Kim, Seoul (KR); Byung Duk Lee, Seoul (KR); Jae Kook Ko, Paju-si (KR)

(73) Assignees: Tae Jin Kim, Seoul (KR); Byung Duk Lee, Seoul (KR)

( * ) Notice: Subject to any disclaimer, the term of this patent is extended or adjusted under 35 U.S.C. 154(b) by 200 days.

(21) Appl. No.: 15/581,532

(22) Filed: Apr. 28, 2017

(65) Prior Publication Data

US 2018/0077759 A1    Mar. 15, 2018

(51) Int. Cl.
| | |
|---|---|
| *H05B 6/10* | (2006.01) |
| *H02K 1/27* | (2006.01) |
| *H02K 5/16* | (2006.01) |
| *H02K 16/00* | (2006.01) |
| *H02K 49/04* | (2006.01) |

(Continued)

(52) U.S. Cl.
CPC .............. *H05B 6/109* (2013.01); *H02K 1/276* (2013.01); *H02K 1/2746* (2013.01); *H02K 1/28* (2013.01); *H02K 5/16* (2013.01); *H02K 7/14* (2013.01); *H02K 16/005* (2013.01); *H02K 49/043* (2013.01); *H02K 53/00* (2013.01);

(Continued)

(58) Field of Classification Search
CPC ...... H05B 6/109; H05B 6/108; H02K 1/2746; H02K 1/276; H02K 1/28; H02K 5/16; H02K 7/14; H02K 16/005; H02K 49/043; H02K 53/00; H02K 1/2773; H02K 7/1004; H02K 2213/03
See application file for complete search history.

(56) References Cited

U.S. PATENT DOCUMENTS

| | | | | |
|---|---|---|---|---|
| 4,217,475 A * | 8/1980 | Hagerty | ................. | H05B 6/108 |
| | | | | 219/618 |
| 4,511,777 A * | 4/1985 | Gerard | ................... | H05B 6/109 |
| | | | | 219/618 |
| 5,012,060 A * | 4/1991 | Gerard | ..................... | F22B 3/06 |
| | | | | 219/631 |

(Continued)

FOREIGN PATENT DOCUMENTS

| | | |
|---|---|---|
| JP | H05-082248 A | 4/1993 |
| JP | 2005-174801 A | 6/2005 |

(Continued)

*Primary Examiner* — Craig M Schneider
*Assistant Examiner* — David R Deal
(74) *Attorney, Agent, or Firm* — KORUS Patent, LLC; Seong Il Jeong

(57) ABSTRACT

Disclosed herein is a heat generation apparatus using permanent magnets. The heat generation apparatus using permanent magnets includes: a plurality of rotors fixedly mounted on a rotating shaft, and configured such that they are rotatable along with the rotating shaft with permanent magnets disposed thereon at predetermined intervals; a heat generation part configured such that the rotors are contained therein to thus form a predetermined gap between the heat generation part and the rotors, and adapted to generate heat while the permanent magnets are being rotated; a motor configured to serve as a source for the rotation of the rotating shaft; and a power transmission means configured to transfer the rotation force of the motor to the rotating shaft.

6 Claims, 2 Drawing Sheets

(51) Int. Cl.
 *H02K 53/00* (2006.01)
 *H02K 7/14* (2006.01)
 *H02K 1/28* (2006.01)
 *H02K 7/10* (2006.01)

(52) U.S. Cl.
 CPC .......... *H05B 6/108* (2013.01); *H02K 1/2773* (2013.01); *H02K 7/1004* (2013.01); *H02K 2213/03* (2013.01)

(56) References Cited

U.S. PATENT DOCUMENTS

| | | | | |
|---|---|---|---|---|
| 5,914,065 | A * | 6/1999 | Alavi | H05B 6/108 219/631 |
| 9,516,703 | B1 * | 12/2016 | Nelson | H05B 6/109 |
| 2003/0066830 | A1 * | 4/2003 | Reed | H05B 6/108 219/672 |
| 2005/0006381 | A1 * | 1/2005 | Lunneborg | H05B 6/108 219/672 |
| 2005/0263522 | A1 * | 12/2005 | Lunneborg | H05B 6/108 219/672 |
| 2012/0193924 | A1 * | 8/2012 | Okazaki | F03D 9/22 290/55 |
| 2013/0333411 | A1 * | 12/2013 | Albertson | H05B 6/108 62/476 |
| 2015/0061419 | A1 * | 3/2015 | Li | H02K 53/00 310/48 |
| 2016/0072373 | A1 * | 3/2016 | Farquharson | H02K 7/116 310/83 |

FOREIGN PATENT DOCUMENTS

| | | |
|---|---|---|
| KR | 10-2004-0040435 A | 5/2004 |
| KR | 10-2012-0109210 A | 10/2012 |
| KR | 10-2015-0047121 A | 5/2015 |
| KR | 10-1541417 B1 | 8/2015 |

* cited by examiner

HEAT GENERATION APPARATUS USING PERMANENT MAGNETS

BACKGROUND

1. Technical Field

The present invention relates generally to a heat generation apparatus using permanent magnets, and more particularly to a heat generation apparatus using permanent magnets, which generates heat by using permanent magnets and heats a fluid by using the generated heat, thereby providing economic feasibility and high thermal efficiency.

2. Description of the Related Art

Conventionally, coal, heavy oil, liquefied gas, etc. have been used as energy sources for boilers that produce hot water. These energy sources have been causes of air pollution due to the discharge of toxic gases.

Furthermore, although conventionally, gas, petroleum, electricity, etc. have been used for hot-water heating, problems arise in that gas and petroleum are expensive and have poor thermal efficiency and electricity has the problem of incurring high electric charges.

For example, the use of boilers using midnight electricity had been recommended by Korean government. However, as the demand for electricity surpassed the supply of electricity, the advantage of the boilers using midnight electricity disappeared.

Therefore, there is a need for a heat generation apparatus that is capable of performing highly efficient hot-water heating without causing an environmental problem attributable to the discharge of toxic gas.

PRIOR ART DOCUMENTS

Patent Documents

Patent document 1: Korean Patent Application Publication No. 10-2004-0040435 (published on May 12, 2004)
Patent document 2: Korean Patent Application Publication No. 10-2012-0109210 (published on Oct. 8, 2012)

SUMMARY

The present invention has been conceived to meet the above-described need, and an object of the present invention is to provide a heat generation apparatus using permanent magnets, in which the principle of induction heating attributable to the magnetic fields of rotating permanent magnets is applied and a metal having high current conductivity and low electric resistance is heated and directly used as a heat exchanger, and accordingly thermal efficiency is significantly high and toxic gas is not discharged, thus being environment-friendly.

According to an aspect of the present invention, there is provided a heat generation apparatus using permanent magnets, the heat generation apparatus including: a plurality of rotors fixedly mounted on a rotating shaft, and configured such that they are rotatable along with the rotating shaft with permanent magnets disposed thereon at predetermined intervals; a heat generation part configured such that the rotors are contained therein to thus form a predetermined gap between the heat generation part and the rotors, and adapted to generate heat while the permanent magnets are being rotated; a motor configured to serve as a source for the rotation of the rotating shaft; and a power transmission means configured to transfer the rotation force of the motor to the rotating shaft; wherein insertion slits are formed in each of the rotors by a plurality of partitions formed through the outer circumferential surface of the rotor and a plurality of permanent magnets is inserted in a circumferential direction, the permanent magnets are inserted into the insertion slits so that the N poles thereof are disposed in an identical direction and the S poles thereof are also disposed in an identical direction, thereby generating repulsive force.

The heat generation part may be disposed inside heat storage and may exchange heat with a fluid contained in the heat storage, and a plurality of protrusions may be formed on the surface of the heat generation part in order to increase a heat exchange area.

The heat generation part and the rotors may be made of an aluminum material, and the gap between the rotors and the heat generation part may range from 0.1 to 0.5 mm.

The rotors may be 2 to 16 in number and may be mounted on the rotating shaft at predetermined intervals, and walls made of a material that does not pass a line of magnetic force therethrough may be each disposed between two adjacent ones of the rotors so that the rotors are disposed in an independent state.

The permanent magnets may be made of a neodymium material, the length of the permanent magnets may range from 35 to 45 mm, the height of the permanent magnets may range from 15 to 25 mm, and the width of the permanent magnets may range from 5 to 15 mm.

The power transmission means may include a first pulley configured such that the shaft of the motor shaft is axially and fixedly inserted thereinto, a second pulley configured such that the rotating shaft is axially and fixedly inserted thereinto, and a timing belt configured to connect the first pulley and the second pulley and transfer the rotation force of the first pulley to the second pulley.

At least one bearing configured to support the rotating shaft so that the rotating shaft can be smoothly rotated may be disposed around the portion of the rotating shaft between the second pulley and the rotors, the rotation ratio between the first pulley and the second pulley may be 1:3, and the rotation speed of the rotating shaft is set to a speed of 9,000 to 11,000 RPM by taking into consideration the heat generation of the heat generation part and the wear of the bearing.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

The configurations and operations of embodiments of the present invention will be described below with reference to the accompanying drawings.

It should be noted that throughout the drawings, the same components will be denoted by the same reference symbols as much as possible.

In the following description of the present invention, detailed descriptions of related well-known functions or configurations that are determined to make the gist of the present invention unnecessarily obscure will be omitted.

Throughout the specification and the claims, unless explicitly described to the contrary, the terms "include" and "comprise" and their variants, such as "includes," "including," "comprises" and "comprising," will be understood to imply the inclusion of described components, not the exclusion of any other components.

First, in order to help to understand the present invention, the principle of induction heating attributable to a magnetic field is described below.

When a magnetic field (or a magnet) approaches a conductor, hysteresis loss and eddy current loss occur in the conductor, and thus Joule's heat is generated.

In particular, a ferromagnetic material that is more easily attracted to a magnet has higher resistance, and thus Joule's heat increases. The iron loss that is generated in a power generator, an electric motor, a transformer, or the like is a representative example of induction heating attributable to a magnetic field.

The iron loss in the above structure is based on Joule's heat, and is thus proportional to the square of current and resistance. Heat is generated in metals having high resistance, such as steel, nickel, nichrome wire, etc., and is also generated in metals having low resistance and conducting a large amount of current, such as copper, aluminum, silver, etc.

Generally, the iron loss is the sum of hysteresis loss and eddy current loss. It is known that the hysteresis loss is responsible for 70% of the total iron loss and the eddy current loss is responsible for 30% of the total iron loss. Accordingly, the iron loss is basically proportional to the square of the magnet density of a rotor and the square of the RPM of the rotor. As a result, as the size of the rotor increases, as the RPM of the rotor increases, or as the number of poles of the rotor, the amount of heat generated increases by four times.

Figure 1:
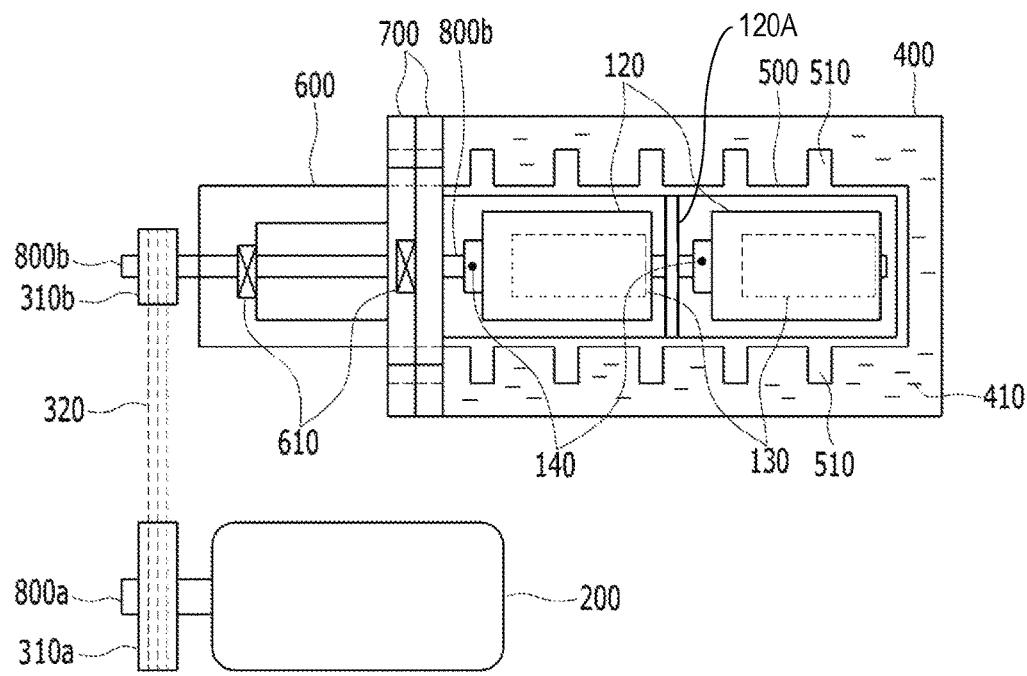
FIG. 1 is a diagram showing the configuration of a heat generation apparatus using permanent magnets according to an embodiment of the present invention.

FIG. 1 is a diagram showing the configuration of a heat generation apparatus using permanent magnets according to an embodiment of the present invention.

As shown in FIG. 1, the heat generation apparatus according to an embodiment of the present invention includes rotors 120, a motor 200, a power transmission means 300, heat storage 400, and a heat generation part 500.

Figure 2:
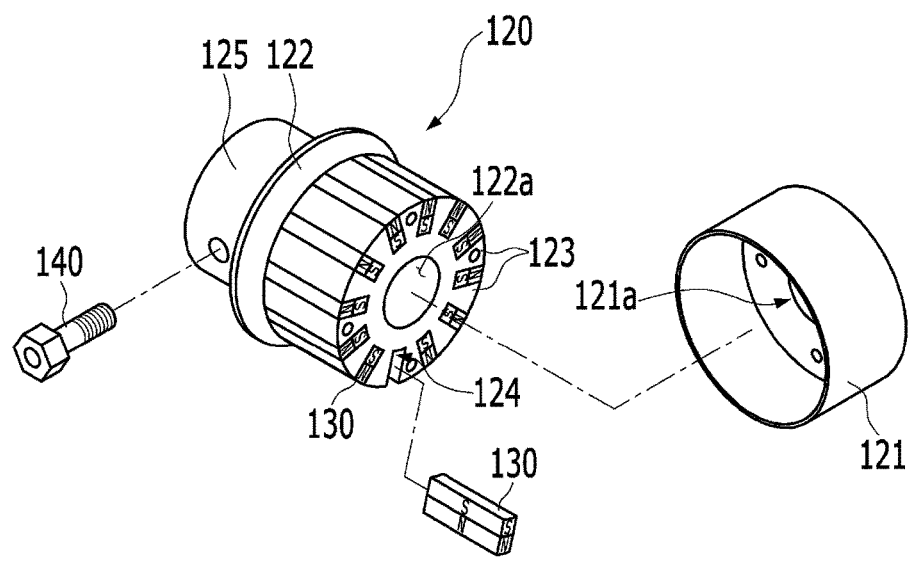
FIG. 2 is an exploded perspective view showing the rotor shown in FIG. 1.

As shown in FIG. 2, each of the rotors 120 includes a circular rotation body 122 and a circular case 121 coupled to the rotation body 122 through fitting over the rotation body 122. Through holes 122a and 121a are formed through the rotation body 122 and the case 121, respectively, in a lengthwise direction so that a rotating shaft 800b can pass through the rotation body 122 and the case 121.

A plurality of insertion slits 124 is formed in the rotation body 122 so that permanent magnets 130 are inserted at regular intervals in a circumferential direction by a plurality of partitions 123 formed along the outer circumferential surface of the rotation body 122.

In this case, the permanent magnets 130 are inserted into the insertion slits 124 at regular intervals so that the N poles of the permanent magnets 130 are disposed in the same direction and the S poles of the permanent magnets 130 are disposed in the same direction, thereby generating repulsive force.

In contrast, when a heat generation apparatus is implemented by alternating the N and S poles of the permanent magnets 130, a problem arises in that heavy load is applied during the operation of the heat generation apparatus and thus the motor 200 cannot endure the heavy load and is damaged. Furthermore, a problem arises in that the amount of power consumption is also increased in proportion to the load. Accordingly, it is preferable to dispose the same poles in the same direction.

The length of the permanent magnets 130 is 5-100 mm, preferably 35-45 mm, the height of the permanent magnets 130 is 5-40 mm, preferably 15-25 mm, and the width of the permanent magnets 130 is 3-20 mm, preferably 5-15 mm.

When the dimensions of the permanent magnets 130 are greater than the above-described specifications, thermal efficiency is degraded.

The permanent magnets 130 are preferably made of neodymium that is resistant to high-temperature heat and has resistance up to 250° C.

Although ferrite magnets are suitable for high temperature, neodymium magnets are suitable for the present invention.

Furthermore, a fastening protrusion 125 protrudes from the side of the rotation body 122 opposite the side of the rotation body 122 coupled to the case 121, and a fastening bolt 140 is screwed into the fastening protrusion 125 in a vertical direction so that the fastening protrusion 125 is securely mounted and fastened onto the rotating shaft 800b.

Accordingly, when the rotating shaft 800b is rotated, the rotor 120 is rotated along with the rotating shaft 800b.

As shown in FIG. 1, 2 to 16 rotors 120 may be fastened onto the single rotating shaft 800b at predetermined intervals in series.

In this case, it is preferable to dispose walls 120A, made of a material (e.g., iron, or the like) that does not pass magnetic force therethrough, between every two adjacent ones of the rotors 120, and thus the rotors 120 can be disposed in an independent state in which there is no interference, attributable to a line of magnetic force or the like, between the rotors 120.

Furthermore, the plurality of rotors 120 may be disposed in series such that the N poles of permanent magnets are disposed in the same direction and the S poles of the permanent magnets are disposed in the same direction.

The one or more rotors 120 are rotatably inserted into the circular heat generation part 500 in the state in which the one or more rotors 120 have been fixedly mounted on the single rotating shaft 800b.

In this case, the gap between the rotors 120 and the heat generation part 500 is 0.005-8 mm, preferably 0.1-0.5 mm.

In other words, when the gap is equal to or greater than 0.5 mm, heat is not sufficiently transferred to the heat generation part 500, and thus a heat generation effect is degraded. In contrast, when the gap is equal to or less than 0.1 mm, the heat generation part 500 may interfere with the rotation of the rotor 120.

Meanwhile, a permanent magnet may be mounted on the surface of the heat generation part 500, the permanent magnet may be disposed such that the pole of the permanent magnet and the corresponding poles of the permanent magnets 130 of the rotors 120 are disposed in the same direction, and then thermal energy may be generated. In this case, the temperature of the permanent magnet mounted on the heat generation part 500 may increase rapidly, and thus the permanent magnets 130 of the rotors 120 may lose their magnetic force due to high temperature.

Accordingly, according to the present invention, it is preferable not to mount a permanent magnet on the surface of the heat generation part 500.

The heat generation part 500 and the rotors 120 are made of a nonferrous metal, such as aluminum, or the like.

Furthermore, the heat generation part 500 is disposed inside the heat storage 400, and heats a predetermined fluid (for example, water) 410 inside the heat storage 400 through heat exchange with the fluid. The heat storage 400 may be, for example, a hot water storage tank.

In this case, in order to enlarge the area of heat exchange between the heat generation part 500 and the fluid 410, it is preferred that a plurality of protrusions 510 protrudes from the surface of the heat generation part 500.

A flange 700 is formed on the heat generation part 500 in a direction in which the rotating shaft is inserted is coupled to the flange 700 of a bearing housing 600.

In this case, in the state of being supported by at least one bearing 610 provided inside the bearing housing 600 so that the rotating shaft 800b can be smoothly rotated, the rotating shaft 800b protrudes from the bearing housing 600, and is axially and fixedly inserted into a second pulley 310b, i.e., a part of the power transmission means.

The rotation power of the motor 200, which is a source of power used to rotate the rotating shaft 800b, is transferred to the rotating shaft 800b through the power transmission means.

In other words, the power transmission means includes a first pulley 310a configured such that a motor shaft 800a is axially and fixedly inserted thereinto, the second pulley 310b configured such that the rotating shaft 800b is axially and fixedly inserted thereinto, and a timing belt 320 configured to connect the first pulley 310a and the second pulley 310b and transfer the rotation force of the first pulley 310a to the second pulley 310b.

In this case, the rotation ratio between the first pulley 310a and the second pulley 310b are set to 1:3, and thus the rotors 120 can be rotated three times the rotation speed of the motor 200.

For example, when the motor shaft 800a makes one rotation, the rotating shaft 800b makes three rotations. Accordingly, when the motor shaft 800a is rotated at a speed of 3,450 RPM, the rotating shaft 800b and the rotor 120 can be rapidly rotated at a speed of 10,350 RPM (=3,450 RPM×3).

When the rotating shaft 800b is rotated at a speed higher than 11,000 RPM, the wear of the bearing 610 becomes significant. Accordingly, the rotation speed of the rotors 120 is preferably set to a speed of 9,000-11,000 RPM by taking into consideration the amount of heat generated.

The present invention configured as described above is directed to the apparatus in which the permanent magnets are mounted on the rotors and heat, generated in the heat generation part while the rotors are being rotated in the state in which the narrow gap between a stationary part (the heat generation part) and the rotors is maintained, is efficiently used.

In the embodiment of the present invention, a case where thermal energy generated in the above apparatus is applied to hot-water heating has been described.

In the above-described configuration, the rotation force of the motor 200 is transferred through the power transmission means, and thus the rotors 120 are rotated. The rotating shaft 800b is rotated at a speed of about 10,000 RPM based on the rotation ratio between the first pulley 310a and the second pulley 310b.

Accordingly, the plurality of permanent magnets 130 provided in the rotors 120 generates lines of magnetic force, and heat is generated in the heat generation part by the lines of magnetic force.

In this case, thermal efficiency is increased by minimizing the gap between the heat generation part 500 and the rotors 120. Accordingly, according to the present invention, the temperature of the inside rotors 120 is 55° C., and the temperature of the outside heat generation part 500 is equal to or higher than 100° C.

In the present invention, heat is recovered through heat exchange between the outside heat generation part 500 having a temperature equal to or higher than 100° C. and the water, and is then used for hot-water heating.

Figure 3:
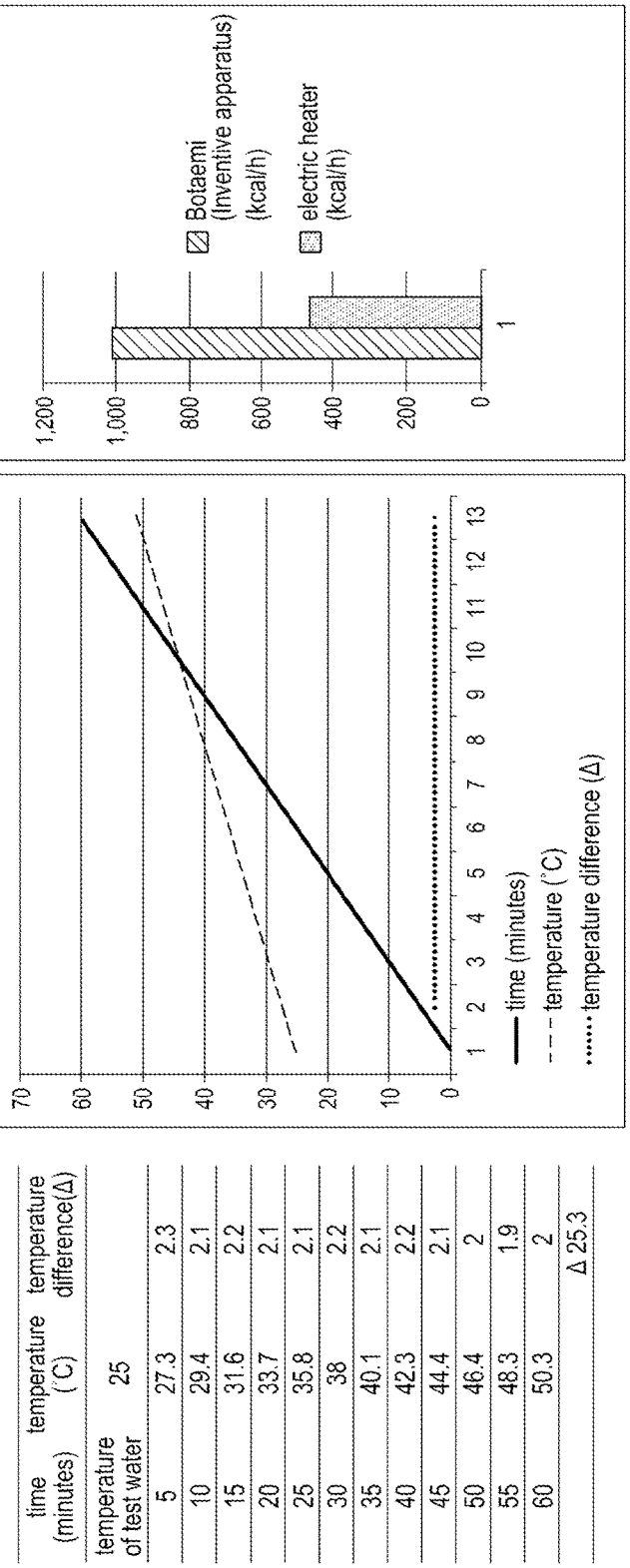
FIG. 3 is a graph showing the comparison between the thermal efficiency of a heat generation apparatus according to an embodiment of the present invention and the thermal efficiency of a typical electric heater.

FIG. 3 is a graph showing the comparison between the thermal efficiency of a heat generation apparatus according to an embodiment of the present invention and the thermal efficiency of a typical electric heater.

As shown in FIG. 3, water having a temperature of 50.3° C. was obtained by heating water 410 having a temperature of 25° C. by using a power consumption of 550 W (220 V×2.5 A) for one hour, and thus a temperature rise of 25.3° C. was achieved.

In this case, thermal efficiency was 1.012 kcal/h, and thus was 2.14 times that of the typical electric heater in terms of coefficient of performance (COP), which was an expression of thermal efficiency. From this, it can be seen that efficiency that is twice or more that of the typical electric heater was achieved.

According to the above-described present invention, the principle of induction heating attributable to the magnetic fields of the rotating permanent magnets is applied and a metal having high current conductivity and low electric resistance is heated and directly used as a heat exchanger, and accordingly thermal efficiency is significantly high and toxic gas is not discharged, thus being environment-friendly.

While the technical spirit of the present invention has been described with reference to the accompanying drawings, this is intended merely to illustrate the preferred embodiments of the present invention, but is not intended to limit the present invention.

Furthermore, it will be apparent to those having ordinary knowledge in the art to which the present invention pertains that various modifications and alterations can be made without departing from the technical spirit of the present invention.

What is claimed is:

1. A heat generation apparatus using permanent magnets, the heat generation apparatus comprising:
   a plurality of rotors fixedly mounted on a rotating shaft, and configured such that they are rotatable along with the rotating shaft with permanent magnets disposed thereon at predetermined intervals;
   a heat generation part configured such that the rotors are contained therein to thus form a predetermined gap between the heat generation part and the rotors, and adapted to generate heat while the permanent magnets are being rotated;
   a motor configured to serve as a source for rotation of the rotating shaft; and
   a power transmission means configured to transfer rotation force of the motor to the rotating shaft;
   wherein insertion slits are formed in each of the rotors by a plurality of partitions formed through an outer circumferential surface of the rotor, and the permanent magnets are inserted into the insertion slits and arranged such that N pole of each permanent magnet is disposed at an identical end portion of each of the insertion slits in a radial direction and S pole of each permanent magnet is disposed at an opposite end portion of each of the insertion slits in the radial direction, thereby generating repulsive force between two neighboring permanent magnets; and wherein the rotors are 2 to 16 in number and are mounted on the rotating shaft at predetermined intervals, and walls made of a material that does not pass a line of magnetic force therethrough are each disposed between two adjacent ones of the rotors so that the rotors are disposed in an independent state.

2. The heat generation apparatus of claim 1, wherein the heat generation part is disposed inside heat storage and exchanges heat with a fluid contained in the heat storage, and a plurality of protrusions is formed on a surface of the heat generation part in order to increase a heat exchange area.

3. The heat generation apparatus of claim 1, wherein the heat generation part and the rotors are made of an aluminum material, and the gap between the rotors and the heat generation part ranges from 0.1 to 0.5 mm.

4. The heat generation apparatus of claim 1, wherein the permanent magnets are made of a neodymium material, a length of the permanent magnets ranges from 35 to 45 mm, a height of the permanent magnets ranges from 15 to 25 mm, and a width of the permanent magnets ranges from 5 to 15 mm.

5. The heat generation apparatus of claim 1, wherein the power transmission means comprises a first pulley configured such that a shaft of the motor shaft is axially and fixedly inserted thereinto, a second pulley configured such that the rotating shaft is axially and fixedly inserted thereinto, and a timing belt configured to connect the first pulley and the second pulley and transfer rotation force of the first pulley to the second pulley.

6. The heat generation apparatus of claim 5, wherein at least one bearing configured to support the rotating shaft so that the rotating shaft can be smoothly rotated is disposed around a portion of the rotating shaft between the second pulley and the rotors, a rotation ratio between the first pulley and the second pulley is 1:3, and a rotation speed of the rotating shaft is set to a speed of 9,000 to 11,000 RPM by taking into consideration heat generation of the heat generation part and wear of the bearing.

* * * * *